May 5, 1942.

P. J. HEALY 2,281,973

SWIVEL CONNECTION

Filed Dec. 14, 1940

Inventor
Patrick J. Healy

By J. S. Murray
Attorney

Patented May 5, 1942

2,281,973

UNITED STATES PATENT OFFICE 2,281,973

SWIVEL CONNECTION

Patrick J. Healy, Detroit, Mich.

Application December 14, 1940, Serial No. 370,166

2 Claims. (Cl. 285—97.7)

This invention relates to swivel connections and particularly connections for permanently swiveling a nut on a body to which a pipe, bolt, or other threaded part may be coupled by such nut.

An object of the invention is to provide for swivelly assembling a nut in permanent engagement with a body by a simple press operation, lending itself to rapid quantity production of such swivel assemblies.

Another object is to utilize a wedge member to effect contraction of an annular or substantially annular portion of a nut, thus conforming said portion to a flared or undercut collar and permanently swiveling the nut on a body from which such collar projects.

A further object is to establish an interlock between said wedge member and nut, as the former takes effect on the latter, whereby any escape of the wedge member from its effective position is strongly resisted.

These and various other objects are attained by the construction hereinafter described and illustrated in the accompanying drawing, wherein.

Figure 1:
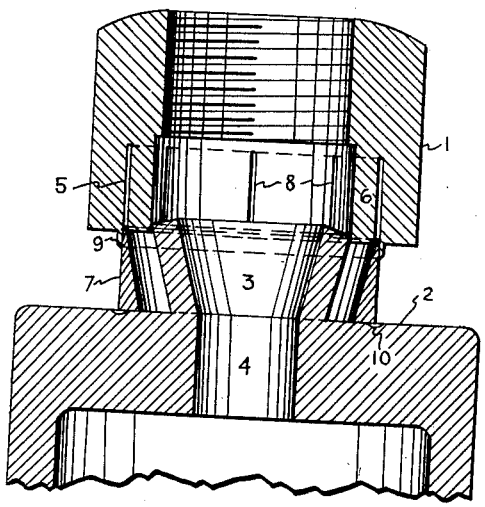
Fig. 1 is an axial sectional view of a nut and a body for swivelly mounting the nut, showing the position of said parts preliminary to a press operation.

In these views, the reference character 1 designates a nut designed to be swivelly mounted on a body 2, the latter being integrally formed with a projecting collar 3 for holding said nut, flaring from its base to its free end. The body shown is hollow and has a passage 4 extending from its interior to the opening formed by the collar, but the particular nature of the body is immaterial. The opening of the nut is of a diameter, as regards at least its inner portion, to permit the nut to slip freely over the collar 3, and the outer portion of said opening is screw-threaded. Machined in the inner end face of the nut, coaxially with the latter, is a restricted annular groove 5 having a depth approximately equal to the length of the collar 3. The purpose of this groove is to produce an annular wall 6 defining the inner end portion of the nut opening and proportioned to adapt it to be deflected into said opening, as the nut is forced over the collar 3, and to be substantially conformed to the collar. As a preferred means for deflecting the wall 6, there is provided a wedge ring 7 having a cylindrical outer face proportioned to snugly engage the outer face of the groove 5. The inner face of said ring is frustro-conical, its divergency to the ring axis being slightly more acute than the angle formed by the outer face of the collar 3 with the axis of said collar. The height or end-to-end dimension of the wedge ring is slightly less than the depth of the groove 5.

In some embodiments of the invention, it may be desirable to weaken the wall 6 so as to reduce its resistance to inward deflection. This result may be achieved by drilling suitably spaced bores 8 into said wall from the inner end of the nut, the diameter of said bores slightly exceeding the thickness of the wall, so as to divide latter into downwardly projecting tongues.

In utilizing the described features to swivelly and permanently mount the nut on the collar 3, the wedge ring is first positioned on the body 2, coaxially with the collar 3 and with the reduced end of said ring uppermost. The nut is then seated on the wedge ring with the reduced end of the latter slightly inserted in the groove 5 and with the collar 3 projecting slightly into the opening of the nut. Powerful downward pressure is now applied to the nut by a press (not shown) or in other suitable manner, and resultant actuation of the nut to its position shown in Fig. 2, causes insertion of the wedge ring in the groove 5 and inward deflection of the wall 6 to conform it substantially to the collar 3. The deflected wall has, however, sufficient clearance from the collar 3 that the nut may freely swivel on said collar, such clearance allowing the nut relief against any tendency of the wedge ring to set up a clamping reaction with the top face of the body 2.

Figure 2:
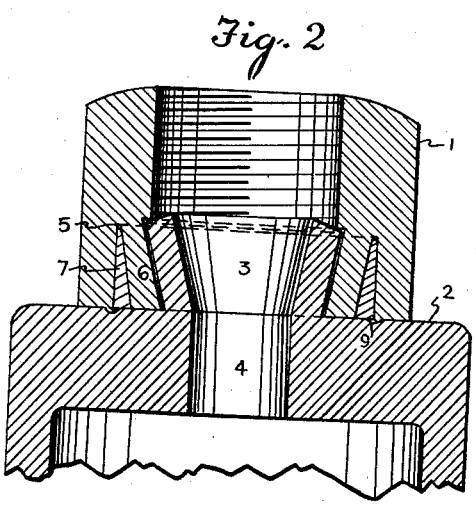
Fig. 2 is a similar view but showing the nut and body interconnected as at completion of the press operation.
Figure 3:
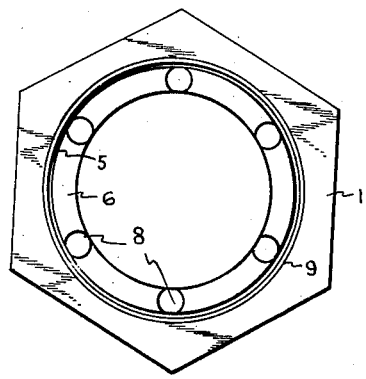
Fig. 3 is an end view of the nut, prior to its distortion by the wedge member.

To resist any tendency of the nut or of forces applied thereto to eject the wedge ring downwardly, there may be formed on the inner end of the nut, a thin annular flange or rib 9, exteriorly adjacent to the groove 5, said flange encountering a shallow annular groove 10 in the top face of the body 2 as the nut approaches said body and such groove acting to deflect the flange inwardly so that it may underlap the wedge ring, as appears in Fig. 2. Thus said flange will materially resist any force tending to eject the ring from the groove 5.

Figure 4:
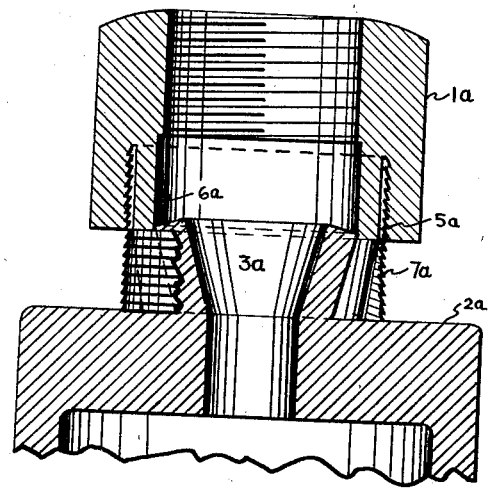
Fig. 4 is a view similar to Fig. 1, but showing a modified feature of the nut and wedge member.

In the modification illustrated by Fig. 4, the nut 1a, body 2a, collar 3a, groove 5a, wall 6a, and wedge ring 7a all conform to preceding description, except that the outer faces of the groove and wedge ring are annularly serrated, the serrations being of a ratchet shape such as to readily permit driving the ring into the groove, but strongly resisting withdrawal of the ring.

In either described form, the invention serves to securely mount the nut 1 or 1a on the body 2 or 2a, while permitting the nut to freely turn on the collar 3 or 3a, and hence to be readily connected to or disconnected from a pipe, rod, bolt, or other threaded part (not shown). The assembly operation may be quickly performed, and the stresses set up in establishing the connection are not likely to result in breakage of or damage to any of the parts.

The described connection is particularly advantageous when the nut 1 or 1a and body 2 or 2a are aluminum or some other metal or alloy materially weaker than steel. In such constructions, the wedge ring, if formed of steel, powerfully reinforces the nut while holding the latter swivelly engaged with the body.

It is an important feature of the described construction that the connection formed is inherently inseparable. This follows from the fact that any force tending to pull the nut 1 away from the body 2 tends to return the wall 6 to its original cylindrical form. Hence any such force tends to bind the wedge 7 still more firmly within the groove 5 and hence to prohibit separation of the connected parts.

What I claim is:

1. The combination with a body and a projection rigidly carried by said body and having a relatively reduced inner portion, of a coupling element having an opening freely receiving said projection and having a restricted annular groove substantially coaxial with the projection and extended into the inner face of said element, and producing an annular locking portion on said element, and an annular wedge member inserted in said groove and conforming substantially to its outer wall and effecting deflection of the annular locking portion toward the axis of said projection, the outer faces of the groove and wedge member having interengaged serrations resisting escape of the wedge member from the groove, and the wedge member and coupling element being rotatable in unison relative to said projection, whereby the coupling element is swivelly secured on the projection by the locking portion of said element.

2. The combination set forth in claim 1, said serrations being substantially annular and of a ratchet form strongly resisting withdrawal of the wedge member while offering relatively slight resistance to its insertion.

PATRICK J. HEALY.